United States Patent
Tanizawa

(10) Patent No.: US 9,509,510 B2
(45) Date of Patent: Nov. 29, 2016

(54) COMMUNICATION DEVICE, COMMUNICATION METHOD, AND COMPUTER PROGRAM PRODUCT

(71) Applicant: Kabushiki Kaisha Toshiba, Minato-ku (JP)

(72) Inventor: Yoshimichi Tanizawa, Yokohama (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 0 days.

(21) Appl. No.: 14/645,910

(22) Filed: Mar. 12, 2015

(65) Prior Publication Data

US 2015/0270963 A1     Sep. 24, 2015

(30) Foreign Application Priority Data

Mar. 19, 2014   (JP) .................................. 2014-056596

(51) Int. Cl.

| | |
|---|---|
| *H04L 9/32* | (2006.01) |
| *H04L 9/16* | (2006.01) |
| *H04L 29/06* | (2006.01) |
| *H04L 9/08* | (2006.01) |

(52) U.S. Cl.
CPC .............. *H04L 9/16* (2013.01); *H04L 9/0852* (2013.01); *H04L 63/061* (2013.01); *H04L 2209/24* (2013.01)

(58) Field of Classification Search
CPC ... H04L 9/0811; H04L 9/0844; H04L 9/838; H04L 9/0841
USPC ........................................................ 713/171
See application file for complete search history.

(56) References Cited

U.S. PATENT DOCUMENTS

| 7,178,277 | B2 | 2/2007 | Takeuchi | |
|---|---|---|---|---|
| 2004/0068655 | A1* | 4/2004 | Nishimura | ............. H04H 20/69 713/171 |
| 2013/0251154 | A1 | 9/2013 | Tanizawa et al. | |

FOREIGN PATENT DOCUMENTS

| JP | 2005-117511 A | 4/2005 |
|---|---|---|
| JP | 2013-201537 A | 10/2013 |

OTHER PUBLICATIONS

Mehrdad Dianati, et al., "Architecture and protocols of the future European quantum key distribution network", Security and Communication Networks, vol. 1, (2008), pp. 57-74.

O. Maurhart, Applied Quantum Cryptography, "QKD Networks Based on Q3P", Lect. Notes Phys. vol. 797, Springer-Verlag Berlin Heidelberg, (2010), pp. 151-171.

* cited by examiner

*Primary Examiner* — Anthony Brown
(74) *Attorney, Agent, or Firm* — Oblon, McClelland, Maier & Neustadt, L.L.P.

(57) ABSTRACT

According to an embodiment, a communication device includes a first manager, and a second manager, a first communication unit, a determination unit, a controller, and a second communication unit. The first manager shares a first cryptographic key with a first external device connected via a link. The second manager shares a second cryptographic key to be provided to an application, with the first external device and with a second external device connected via links. The first communication unit transmits the second cryptographic key to the first external device. The determination unit determines whether a device with which the second cryptographic key is to be shared is the first external device. If it is affirmative, the controller controls the second manager to share, as the second cryptographic key, a cryptographic key obtained by converting the first cryptographic key. The second communication unit provides the application with the second cryptographic key.

7 Claims, 8 Drawing Sheets

COMMUNICATION DEVICE, COMMUNICATION METHOD, AND COMPUTER PROGRAM PRODUCT

CROSS-REFERENCE TO RELATED APPLICATIONS

This application is based upon and claims the benefit of priority from Japanese Patent Application No. 2014-056596, filed on Mar. 19, 2014; the entire contents of which are incorporated herein by reference.

FIELD

An embodiment described herein relates generally to a communication device, a communication method, and a computer program product.

BACKGROUND

There is known a cryptographic communication network (key sharing network) configured with a plurality of networked nodes that are mutually connected by a plurality of links. Each node has a function of generating and sharing a random number with opposite nodes that are connected by links, and has a function of performing cryptographic communication over the links by using the random number as a cryptographic key (hereinafter referred to as a link key). Moreover, some of the nodes have a function of generating a cryptographic key (hereinafter referred to as an application key), which is a random number, independently of the links, and has a function of transmitting the generated application key to another node via a link. An application in the key sharing network has a function of acquiring an application key from a node, using the application key as a cryptographic key, and performing cryptographic communication with another application. The cryptographic data communication at this time may be performed via a network (application network), such as the Internet, that differs from the key sharing network. An applications and a node may be implemented in an integrated manner. An application and a node may be configured as terminals independent of each other, and an application key may be transmitted and received between the application and the node.

In a node, a function of generating and sharing a random number (link key) with opposite nodes that are connected by links is implemented by using, for example, a technique commonly called quantum cryptographic communication or quantum key distribution (QKD). There is also known, in a node, a technique to generate a random number (application key) independently of links and to transmit the generated random number to another node via a link.

However, the conventional techniques have a problem that a processing delay for generating and sharing the cryptographic key may occur. For example, a configuration in which a link key is used to share the application key may lead to a large processing delay and processing load as compared with a configuration in which simply the link key is used.

DETAILED DESCRIPTION

According to an embodiment, a communication device includes a first manager, a second manager, a first communication unit, a determination unit, a controller, and a second communication unit. The first manager shares a first cryptographic key with a first external device that is connected via a link. The second manager shares a second cryptographic key that is provided to an application, with the first external device and with a second external device that is connected via a plurality of links. The first communication unit transmits the second cryptographic key to the first external device. The determination unit determines whether a device with which the second cryptographic key is to be shared is the first external device. The controller controls the second manager to share, as the second cryptographic key, a cryptographic key that is obtained by converting the first cryptographic key, when the device with which the second cryptographic key is to be shared is the first external device. The second communication unit provides the application with the second cryptographic key.

An embodiment will be described in detail below with reference to the accompanying drawings.

A quantum key distribution technique is a method for sharing a cryptographic key securely between a transmission node for transmitting a single photon continuously and a reception node for receiving the single photons, the transmission node and reception node being connected by an optical fiber. It is guaranteed based on a principle of quantum mechanics that the cryptographic key shared here is not eavesdropped. It is guaranteed by an information theory that, when cryptographic data communication is performed by using a cryptographic communication method called a one-time pad and by using the shared cryptographic key, the data at this time cannot be deciphered by an eavesdropper who has any kind of knowledge.

Figure 1:
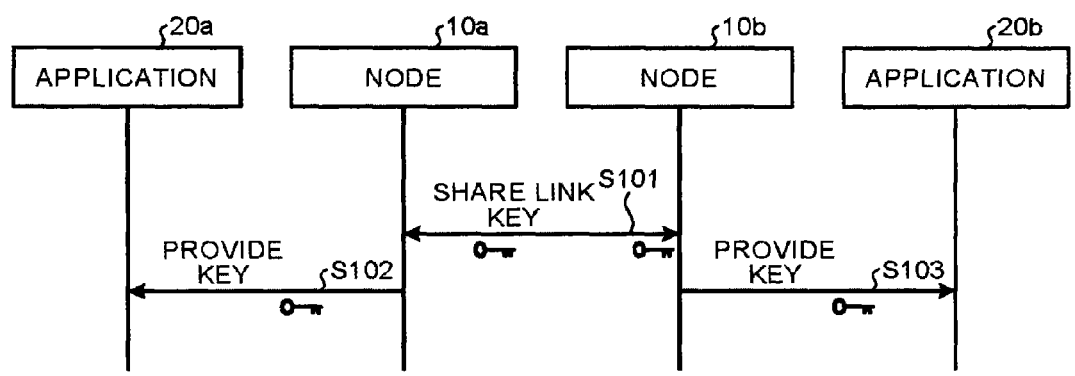
FIG. 1 is a sequence diagram of cryptographic key sharing processing by quantum key distribution.

FIG. 1 is a sequence diagram illustrating an example of cryptographic key sharing processing by quantum key distribution. A communication system (quantum key distribution system) that implements quantum key distribution includes nodes 10a and 10b, and applications 20a and 20b. The nodes 10a and 10b each correspond to at least any one of the transmission node and the reception node. Hereinafter, the transmission node and the reception node may be collectively referred to as a node. The applications 20a and 20b are a function of performing cryptographic data communication by using the shared cryptographic key. As described above, the applications 20a and 20b may be integrally implemented with the nodes 10a and 10b, respectively.

The nodes 10a and 10b start sharing of a link key (step S101). The node 10a provides the application 20a with the shared link key (step S102). Similarly, the node 10*b* provides the application 20*b* with the shared link key (step S103).

In this way, the cryptographic key (link key) shared between the nodes 10*a* and 10*b* is provided to the application 20*a* and the application 20*b*. After this, the application 20*a* and the application 20*b* each encrypt data by using the acquired cryptographic key, and perform cryptographic data communication. However, a method for sharing the cryptographic key by the QKD technique has constraints on a distance at which the cryptographic key can be shared, resulting from the use of a single photon as a medium.

Figure 2:
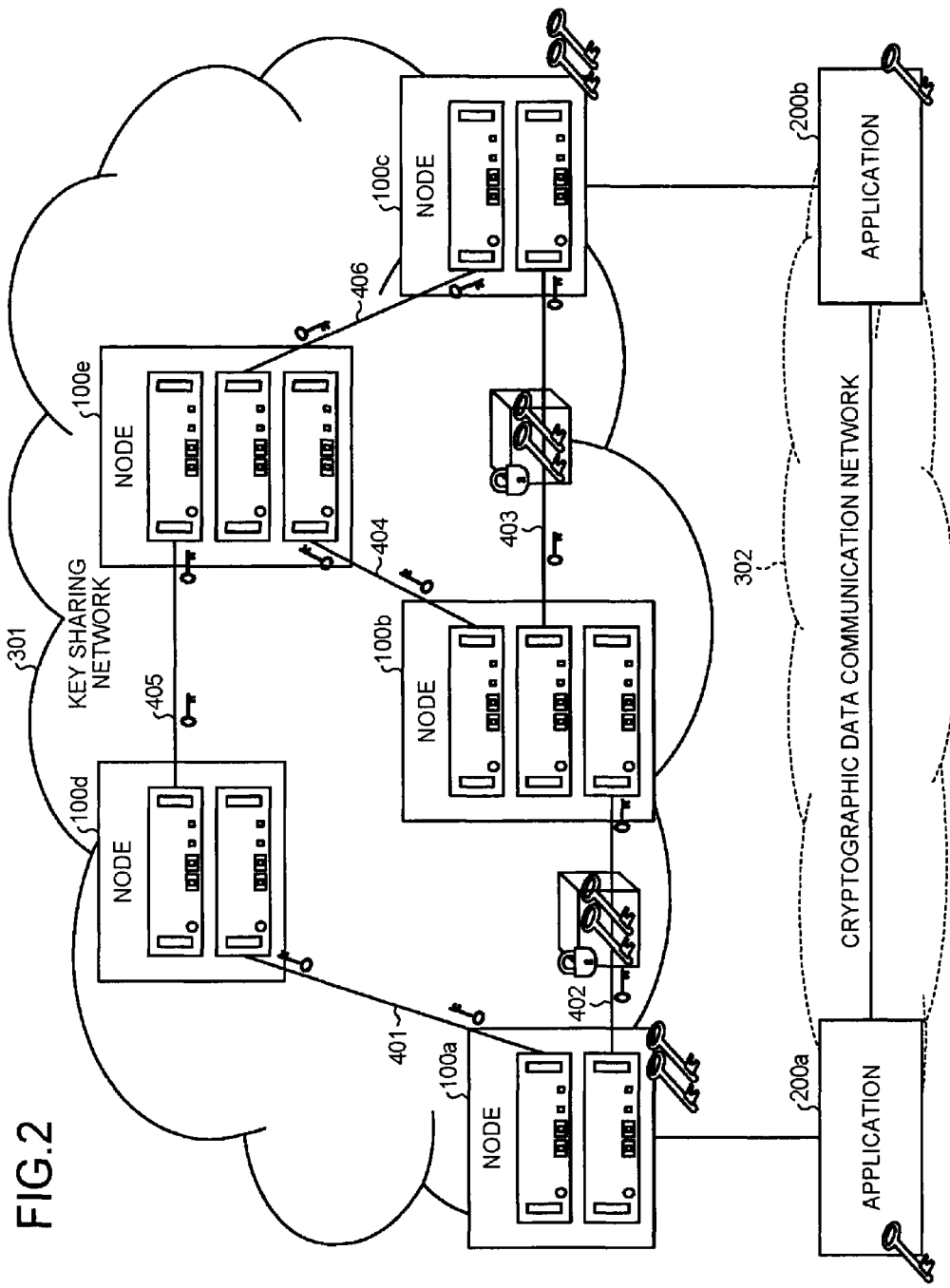
FIG. 2 is a diagram illustrating a configuration example of a quantum key distribution system.

Next, a key sharing network (QKD network) according to the present embodiment will be described. FIG. 2 is a diagram illustrating a configuration example of the quantum key distribution system including the key sharing network. FIG. 2 is an example of a case in which nodes and applications are implemented independently. The quantum key distribution system includes nodes 100*a* to 100*e* as communication devices, and applications 200*a* and 200*b*. The nodes 100*a* to 100*e* share link keys by a key sharing network 301.

When there is no need to distinguish among the nodes 100*a* to 100*e*, the nodes 100*a* to 100*e* may be simply referred to as nodes 100. When there is no need to distinguish between the applications 200*a* and 200*b*, the applications 200*a* and 200*b* may be simply referred to as applications 200. The number of nodes 100 is not limited to five. The number of applications 200 is not limited to two.

The key sharing network 301 is a network in which the plurality of nodes 100 are connected to each other by links (links 401 to 406) made of an optical fiber or the like.

FIG. 2 illustrates a configuration in which one node 100 includes a plurality of functions of a transmission node or a reception node (for example, the node 100*a*, node 100*c*, and node 100*d* each have two functions, whereas the node 100*b* and node 100*e* each have three functions). Alternatively, each node 100 may have a function of a transmission node and a reception node that are integrally provided. The following describes mainly the latter configuration as an example.

Each node 100 shares the cryptographic key by QKD with adjacent nodes 100 connected by the links. The cryptographic key shared by QKD between the nodes 100 that are connected by the links corresponds to the link key (first cryptographic key). The node 100 further has a function of generating another cryptographic key (application key (second cryptographic key)) from random number information and the like, independently of QKD; encrypting the cryptographic key with the link key; and transferring the encrypted cryptographic key to adjacent nodes.

By repeating processing of encrypting the application key with the link key and transferring the encrypted application key, the node 100 can share the application key with an arbitrary node 100 on the key sharing network 301. At this time, the application key is transferred over the links while being encrypted by the link key shared by QKD. Therefore, if the security of the node 100 itself is assumed, it can be said that the security of the application key is guaranteed, similarly to the link key.

Figure 3:
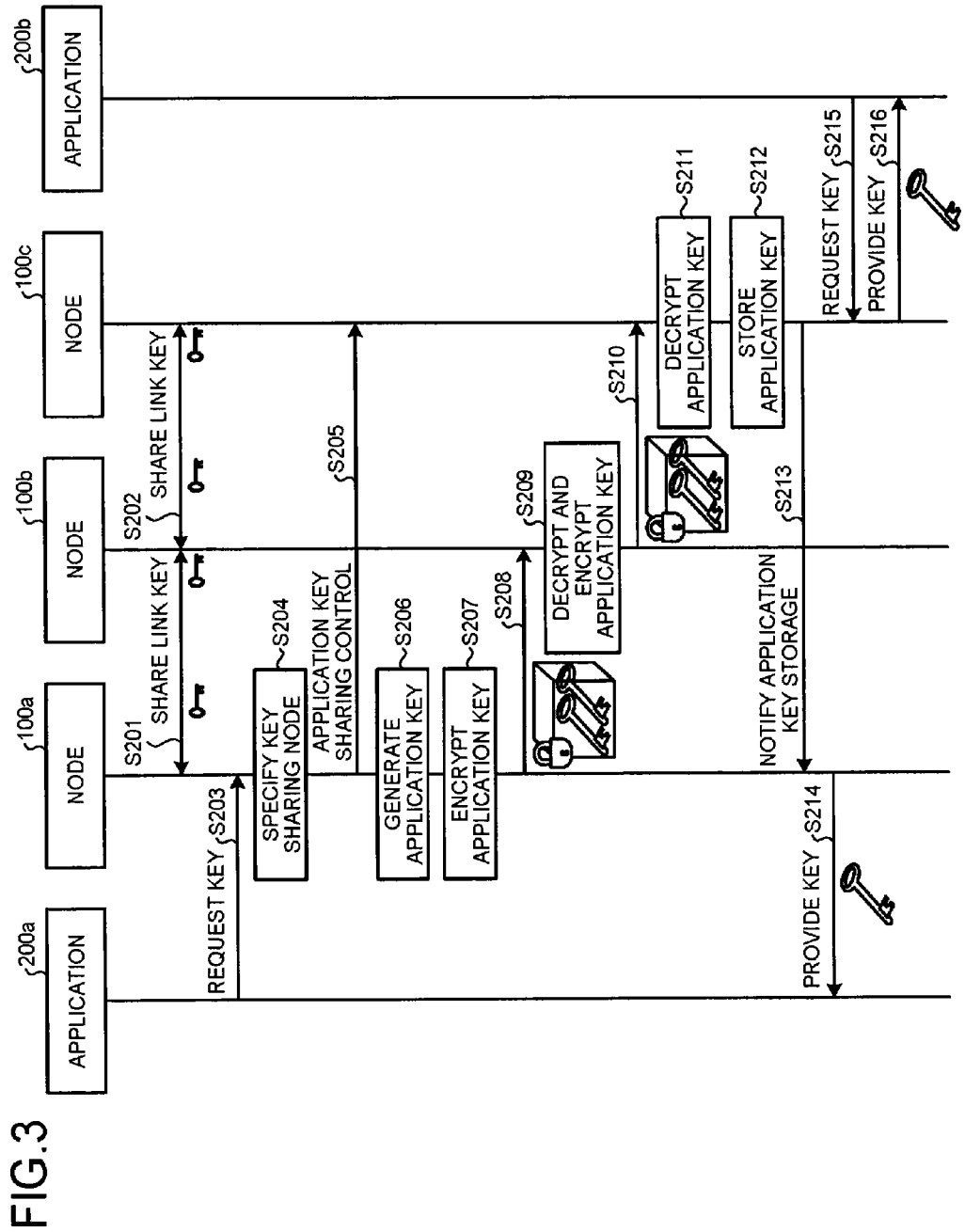
FIG. 3 is a sequence diagram of cryptographic key sharing processing.

An example of a sequence in which the application 200 uses the key sharing network 301 to acquire and share the cryptographic key, and performs cryptographic data communication will be described below. FIG. 3 is a sequence diagram illustrating an example of cryptographic key sharing processing in a case of sharing an application key via three nodes 100.

The node 100*a* and the node 100*b* share link keys in advance (S201) and the node 100*b* and 100*c* share link keys in advance (step S202). An operation of sharing link keys may be repeated thereafter. The application 200 that desires to perform cryptographic communication is connected to a node 100 on the key sharing network 301. For example, in the example of FIG. 2, the application 200*a* is connected to the node 100*a*, whereas the application 200*b* is connected to the node 100*c*.

The application 200*a* notifies the node 100*a* that the application 200*a* desires to use the cryptographic key to communicate with the application 200*b* (step S203). On receipt of this notification, the node 100*a* specifies the node 100*c* to which the application 200*b*, with which the application 200*a* desires to communicate, is connected (step S204), and shares the application key with the node 100*c*.

Specifically, when starting application key sharing control (step S205), the node 100*a* generates an application key to share (step S206). The node 100*a* encrypts the application key by using the link key (link key shared with the node 100*b*) (step S207), and transmits the encrypted application key to the node 100*b* (step S208). The node 100*b* decrypts the received application key with the link key (link key shared with the node 100*a*), and encrypts the decrypted application key with the link key (link key shared with the node 100*c*) (step S209). The node 100*b* transmits the encrypted application key to the node 100*c* (step S210). The node 100*c* decrypts the received application key with the link key (link key shared with the node 100*b*) (step S211), and stores the decrypted application key in a storage unit or the like (step S212). The node 100*c* notifies the node 100*a* that storage of the application key is completed (step S213).

The node 100*a* provides the shared application key to the application 200*a* (step S214). The node 100*c* receives a request from the application 200*b* (step S215), and provides the shared application key to the application 200*b* (step S216). This allows the application 200*a* and the application 200*b* to share the identical cryptographic key (application key). Then, the application 200*a* and the application 200*b* can perform secure cryptographic data communication via the cryptographic data communication network 302.

The aforementioned cryptographic key sharing method that combines application keys and link keys makes it possible to overcome the constraints on a distance at which the cryptographic key can be shared, resulting from the use of QKD. Since the node 100 to which the application 200 is connected controls generation, sharing, and routing of the cryptographic key (application key) in the present method, it is possible to utilize existing network technologies to implement the present method with simple components. Here, a scenario is described in which the node 100*a* generates and shares the cryptographic key (application key) with a random number or the like. Information to share is not limited to the cryptographic key. The present method can be used as a mechanism that allows the node 100*a* to share arbitrary secret information, such as a cryptographic key generated by another system, a digital certificate, and a private key in a public key method.

Figure 4:
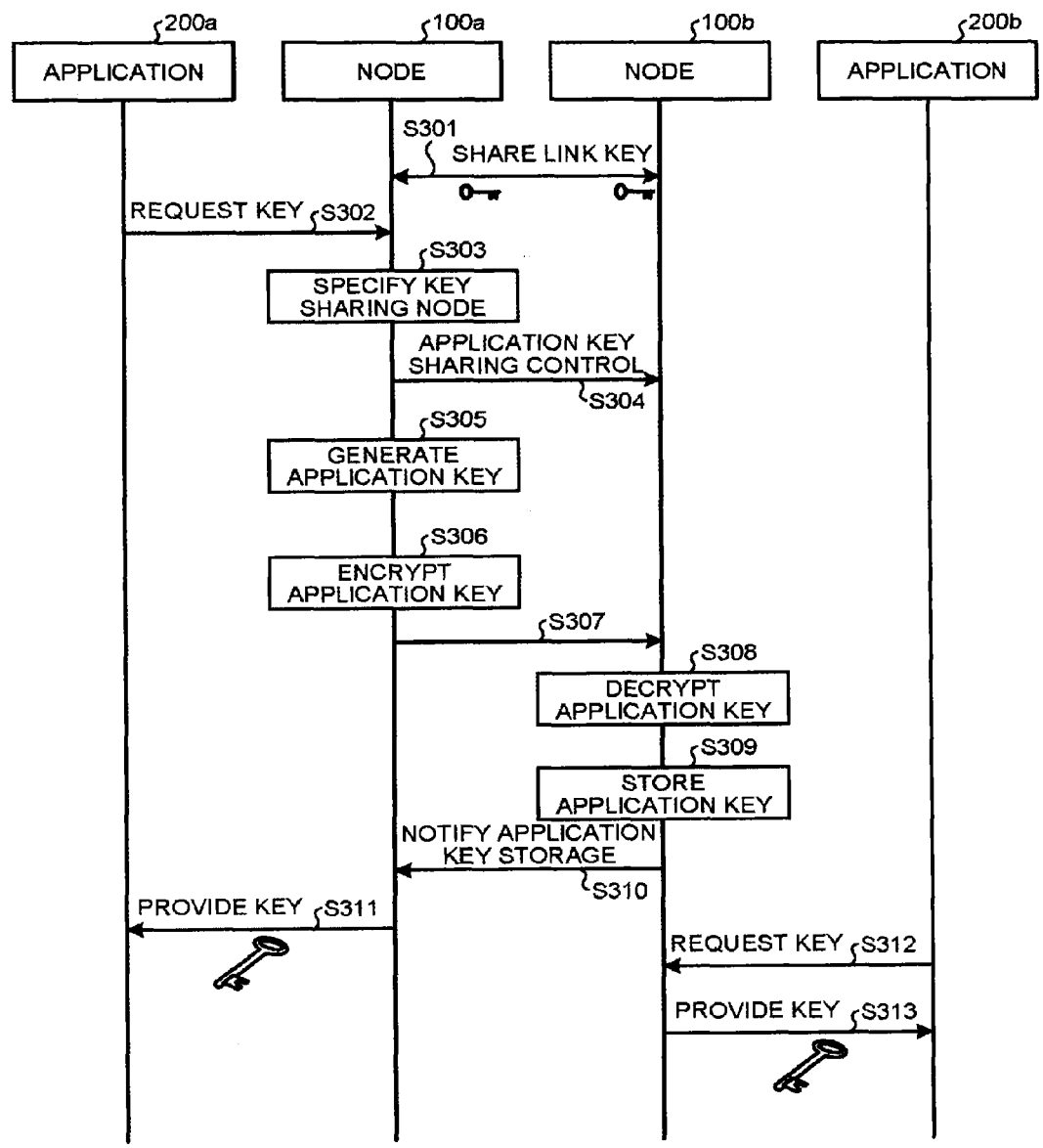
FIG. 4 is a sequence diagram of cryptographic key sharing processing.

FIG. 4 is a sequence diagram illustrating an example of cryptographic key sharing processing when an application key is shared via two nodes 100. FIG. 4 differs from FIG. 3 only in that there is no relaying node 100 (node 100*b* of FIG. 3). For example, step S301 corresponds to step S201. Step S302 to step S307 correspond to step S203 to step S208, respectively. Step S308 to step S313 correspond to step S211 to step S216, respectively.

As illustrated in FIG. 3 and FIG. 4, in the cryptographic key sharing method that combines application keys and link keys, a processing delay and processing load become larger due to procedures including random number generation, encryption of an application key by a link key, and decryption by the link key, as compared with, for example, ordinary cryptographic key sharing by QKD as illustrated in FIG. 1. In this way, the cryptographic key sharing method that combines application keys and link keys can provide a function of sharing the cryptographic key (application key) with an arbitrary node without constraints on a distance. However, the cryptographic key sharing method has a greater processing delay for sharing the cryptographic key. On the other hand, the use of the method illustrated in FIG. 1 leads to a smaller processing delay for sharing the cryptographic key, but brings about constraints on a distance (node connection form) at which the cryptographic key can be shared. That is, there is a trade-off relationship between the constraints on a distance at which the cryptographic key can be shared, and the processing load (processing delay) for sharing processing.

Accordingly, when possible, the node 100 according to the present embodiment provides the application 200 with the cryptographic key (link key) that is simply shared by the method as illustrated in FIG. 1, thereby decreasing the processing delay required for sharing the cryptographic key. In other cases, on the other hand, the node 100 shares the cryptographic key (application key) by the cryptographic key sharing method that combines application keys and link keys, and provides the cryptographic key to the application 200. This makes it possible to solve the above trade-off. This also makes it possible to share the cryptographic key with an arbitrary node on a network, while maintaining simple implementation.

Figure 5:
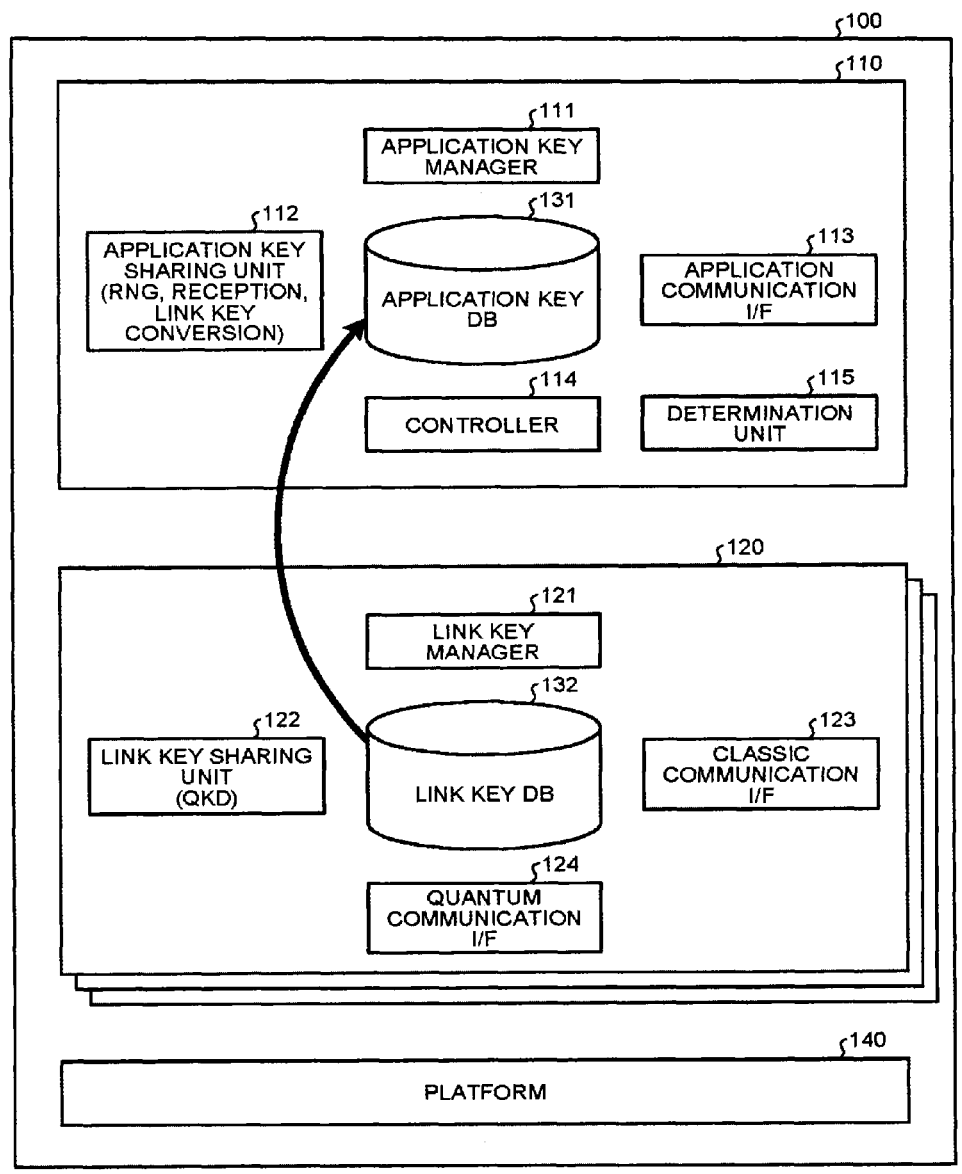
FIG. 5 is a functional block diagram of a node according to the present embodiment.

FIG. 5 is a block diagram illustrating an example of functional configuration of the node 100 according to the present embodiment. The node 100 includes a platform 140, a first sharing processor 110, and a second sharing processor 120.

The platform 140 provides a basic function corresponding to an operating system of a computer, such as a basic network function (a routing function is included), a security function, and a data retention function in the node 100.

The first sharing processor 110 performs processing regarding sharing of the application key. The first sharing processor 110 includes an application key DB 131, an application key manager 111 (second manager), an application key sharing unit 112, an application communication interface (I/F) 113 (second communication unit), a controller 114, and a determination unit 115.

The second sharing processor 120 performs processing regarding sharing of the link keys. The second sharing processor 120 includes a link key DB 132, a link key manager 121 (first manager), a link key sharing unit 122, a classic communication I/F (first communication unit) 123, and a quantum communication I/F 124.

The link key manager 121 manages sharing, storage, and usage of the link keys in the node 100.

The link key sharing unit 122 has a function of generating and sharing the link keys with adjacent nodes connected by an optical fiber by using the QKD technique. Accordingly, the link key sharing unit 122 includes a QKD device including an optical component or the like.

The link key DB 132 stores the link keys shared by the link key sharing unit 122.

Optical fiber connection with adjacent nodes is implemented by the classic communication I/F 123 and the quantum communication I/F 124. The quantum communication I/F 124 is used in order that the link key sharing unit 122 performs transmission or reception of a single photon. The classic communication I/F 123 is used for communication of control data that the link key sharing unit 122 needs to perform with the adjacent nodes in order to share the link keys.

The quantum communication I/F 124 and the classic communication I/F 123 may be communication channels that use an identical and single optical fiber, and may be communication channels that use optical fibers different from each other. However, the quantum communication I/F 124 and the classic communication I/F 123 are connected to an identical node 100.

The second sharing processor 120 may exist for each adjacent node. In the example of FIG. 2, since the node 100a configures links with the node 100b and the node 100d, two sets of the second sharing processors 120 exist in the node 100a. Since the node 100b configures links with the nodes 100a, 100c, and 100e, three sets of the second sharing processors 120 exist in the node 100b. However, regarding the link key DB 132, different links may use an identical database system.

Note that the classic communication I/F 123 is used also from outside the second sharing processor 120 (for example, each functional unit within the first sharing processor 110). When a functional unit outside the second sharing processor 120 transfers data via links to transmit the control data and application key to adjacent nodes, the data is notified from the functional unit to the link key manager 121. The link key manager 121 acquires the link key from the link key DB 132, and encrypts the data with the acquired link key. The encrypted data is transferred to the adjacent nodes via the classic communication I/F 123.

In addition, encrypted data received via the classic communication I/F 123 is also decrypted by the link key manager 121 when the data is addressed to a functional unit outside the second sharing processor 120. For example, the link key manager 121 acquires the link key from the link key DB 132, decrypts the received encrypted data by using the acquired link key, and delivers the decrypted data to the addressed functional unit.

Next, each functional unit of the first sharing processor 110 will be described.

The application key DB 131 stores the application key shared by the application key sharing unit 112.

The application key manager 111 manages sharing, storage, and usage of the application key in the node 100. The application key sharing unit 112 is a functional unit for sharing the application key among the nodes 100 via the key sharing network 301. The application key sharing unit 112 includes a function of generating an application key from a random number generator or the like, a function of transmitting the generated application key via the network, a function of receiving the application key generated by another node 100 via the network, and a function of exchanging control data required for performing such control with another node 100.

The application key to be shared is encrypted and transferred over the links by using the above-mentioned mechanism. Similarly, the control data to be exchanged may be encrypted and transferred over the links by using the above-mentioned mechanism. The shared application key is stored in the application key DB 131.

In the present embodiment, the application key manager 111 has a function of acquiring part of the link keys from the link key DB 132, converting the acquired link key into the application key, and storing the converted application key in the application key DB 131.

The determination unit 115 determines whether the node 100 with which the application key is to be shared is the node 100 that currently shares the link key. For example, when information on a certain node 100 (such as information for identifying the node (node ID) and an address) is shown, the determination unit 115 determines whether connection has been made with this node 100 via a single link, or whether connection has been made via a plurality of links. Details of a determination method will be described later.

The application communication I/F 113 is a functional unit to receive connection from the application 200 that is accommodated in the cryptographic data communication network 302, and to exchange the control data with the application 200.

The controller 114 controls the entire node 100. For example, the controller 114 controls (starts, changes, stops) generation and exchange operations of the application key, and specifies the node 100 with which the application key is to be exchanged, in consideration of the control data to be received from the newly connected application 200, an amount of application keys and an amount of link keys that are currently retained.

The controller 114 also has a function of causing the determination unit 115 to determine a connection relationship with the node 100 with which the application key is to be shared, before generation and sharing of the application key, in response to a request from the application 200. The controller 114 has a function of selecting a method for sharing the application key based on a determination result.

As described above, methods for sharing the application key include the following methods (A1) and (A2):

(A1) A method for generating an application key from a random number generator or the like, and for transferring, relaying, and exchanging the application key via a plurality of links and nodes 100 while encrypting the application key with link keys.

(A2) A method for diverting a link key or part of the link key to an application key.

The controller 114 selects the method for sharing the application key, transmits and receives additional control data required for executing the selected sharing method, and also changes an operation of the node 100. For example, when the node 100 with which the application key is to be exchanged is the adjacent node, the controller 114 determines a range of the link key to be used as the application key, and controls the classic communication I/F 123 to transmit control data for notifying specific information for specifying the determined range to the adjacent node.

On receipt of similar control data from the adjacent node, the controller 114 determines whether it is possible to use the link key as the application key in accordance with a request from the adjacent node. When it is possible to use the link key, the controller 114 instructs the application key sharing unit 112 to perform an operation to convert the link key into the application key.

The controller 114 may determine the method for sharing the application key by taking into consideration parameters other than the connection relationship with the node 100 that requests the application key. For example, even in a case where the determination unit 115 determines that the node 100 that requests the application key is the adjacent node, when an amount (residual quantity of the link key) of the currently accumulated link key is less than a certain threshold (first threshold), the controller 114 may make a determination to avoid employing the method (above (A2)) for diverting the link key to the application key. That is, the controller 114 may make a determination to employ the method (above (A2)) for diverting the link key to the application key only when the residual quantity of the link key is equal to or greater than the certain threshold.

It is also important to use the link key in processing for sharing the application key that is used by the application 200 operating in the node 100 with another node 100 on the network. Accordingly, the controller 114 may make a determination not to employ the method for diverting the link key to the application key.

Here, it is necessary to determine whether to divert the link key to the application key that a certain application 200 (hereinafter referred to as an application $\epsilon$) uses, or whether to consume the application key that another application 200 (hereinafter referred to as an application $\zeta$) uses as the link key for sharing with the node 100 on the network.

Various determination standards are applicable to this determination. For example, when frequency of the use of the link key in processing for sharing the application key is larger than a certain threshold (second threshold), determination may be made to avoid employing the method (above (A2)) for diverting the link key to the application key. That is, determination may be made to employ the method (above (A2)) for diverting the link key to the application key only when the frequency of the use of the link key is equal to or less than the certain threshold. Alternatively, determination may be simply made, for example, according to priority of the application $\epsilon$ and the application $\zeta$ in the node 100. Alternatively, control may be exerted so that an amount of the link key diverted to the application key for the application $\epsilon$ and an amount of the link key used for transferring the application key for the application become identical so as to achieve equal usage by the working application 200.

Generally, however, an application 200 may be newly added, and in that case, it will be necessary to use the link key as the link key to transfer the application key. For this reason, it is preferable to avoid diverting all the link keys to application keys for a specific application 200.

In the application key DB 131, the application key is managed separately for each node 100 that shares this application key. The application key DB 131 and the plurality of link key DBs 132 that each exist in each second sharing processor 120 may be implemented by a single database system, and may be implemented by separate database systems. However, since the application key and the link key have different properties as follows.

The link key is shared between the nodes 100 that are link-connected by QKD, and the node 100 stores the link key for each link. The link key is used (consumed) for encryption of communication (exchange of application keys and control data) via the classic communication I/F 123.

The application key is generated by random number generation by the node 100, and is shared with an arbitrary node 100 via the key sharing network 301. The node 100 stores the application key for each node 100 with which the application key is shared. Moreover, in each node 100, the application key may be assigned to the individual application 200 in advance in consideration of the number and characteristics (priority, etc.) of the connected application 200. The application key is used (consumed) when provided to the application 200 in response to a request from the application 200.

The application key manager 111, the application key sharing unit 112, the application communication interface (I/F) 113, the controller 114, the determination unit 115, the link key manager 121, the link key sharing unit 122, the classic communication I/F 123, and the quantum communication I/F 124 may be implemented by, for example, causing a processing device, such as a central processing unit (CPU), to execute a program, that is, by software, and may be implemented by hardware, such as an integrated circuit (IC), and may be implemented by using software and hardware together. Part of the link key sharing unit 122 may be implemented by an optical circuit device.

The application key DB 131 and the link key DB 132 can be configured with any storage medium commonly used, such as a hard disk drive (HDD), an optical disc, a memory card, and a random access memory (RAM).

Figure 6:
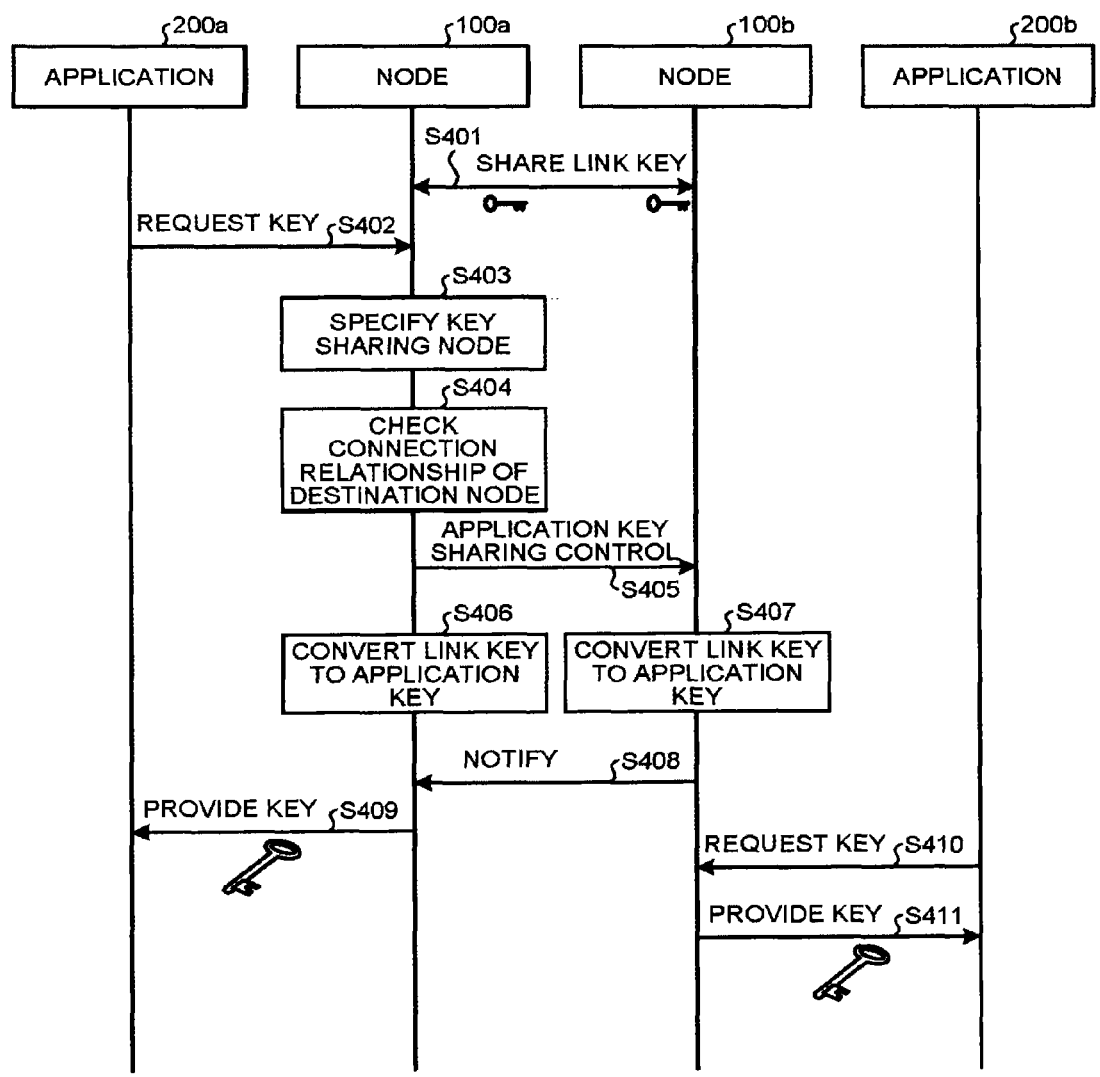
FIG. 6 is a sequence diagram of cryptographic key sharing processing according to the present embodiment.

Next, cryptographic key sharing processing performed by the thus-configured node 100 according to the present embodiment will be described with reference to FIG. 6. FIG. 6 is a sequence diagram illustrating an example of cryptographic key sharing processing according to the present embodiment.

In the example of FIG. 6, the application 200a is connected to the node 100a, whereas the application 200b is connected to the node 100b. The application 200a and the application 200b desire to perform cryptographic data communication. The node 100a and the node 100b repeat an operation of sharing the cryptographic key (link key) by QKD (step S401).

The application 200a is connected to the node 100a, and notifies the node 100a that the application 200a desires to communicate with the application 200b (request for the cryptographic key) (step S402). The communication between the application 200 and the node 100 is protected by some security. For example, it is possible to apply an arbitrary method, such as protection for physically preventing an external person from intruding.

The node 100a, to which the application 200a is connected, determines with which node 100 the cryptographic key (application key) is to be shared in order that the application 200a communicates with the application 200b (step S403).

For example, the node 100a grasps a connection relationship between each node 100 and each application 200, and specifies the node 100 with which the cryptographic key is to be shared by referring to a directory service function or the like. In this example, the node 100a specifies that the node 100 with which the cryptographic key (application key) is to be shared is the node 100b to which the application 200b is connected.

Next, the determination unit 115 of the node 100a checks a connection relationship (connection form) with the node 100b with which the cryptographic key is to be shared (step S404). The connection relationship includes, for example, the following (B1) and (B2):

(B1) In a state where the node itself and another node 100 (hereinafter referred to as an applicable node) are connected by a single link, and where the cryptographic key (that is, link key) is shared by QKD.

(B2) In a state where the node itself and another node 100 are connected by a network via a plurality of links.

Various methods can be used for checking the connection relationship. Examples of the methods are as follows:

(C1) Refer to setup information on QKD.
(C2) Refer to the database (link key DB 132) of link keys.
(C3) Use a protocol for collecting link information, or refer to an execution result of the protocol.
(C4) Refer to an external database directory.

(C1) is a method for referring to the setup information on QKD. If link connection has been made and QKD has been set up, information on the node 100 with which link connection is made (such as a node ID and an address) must have been set in the node itself in advance by an administrator or the like. Accordingly, the determination unit 115 refers to the setup information on QKD. When the setup information on QKD includes a node ID or address of the applicable node, the determination unit 115 can determine that the connection with the applicable node is a single link.

(C2) is a method for referring to the link key DB 132 in which the link key generated by QKD is accumulated. The link key is the cryptographic key that is connected by a single link and is directly generated by QKD. The link key DB 132 stores only the cryptographic key (link key) shared with the node 100 connected by a single link. If the cryptographic key (link key) is shared with the applicable node, the determination unit 115 can determine that the connection relationship with the applicable node is a single link.

(C3) is a method for referring to an external protocol or network information. For example, the determination unit 115 can specify the adjacent node 100 by using a mechanism of a data link layer used. The determination unit 115 can specify the adjacent node 100 by referring to a database that stores a result of specification of the adjacent node 100.

For example, the determination unit 115 can acquire information on an apparatus that has link connection, by using the Cisco discovery protocol (CDP). The determination unit 115 can specify the adjacent node by executing CDP (or a protocol similar to CDP). The determination unit 115 can determine the connection relationship with the applicable node by referring to the database that stores execution or a result of such a protocol.

(C4) is a method for referring to the external database directory. When there exists an external database or directory service that collects information regarding an adjacency relationship of the node 100, the determination unit 115 can acquire the information on the connection relationship by inquiring the node ID or address of the applicable node from such a database or service.

In this example, the determination unit 115 can determine that the connection relationship between the node itself (node 100a) and the applicable node (node 100b) is adjacent (above (B1)) as a result of the determination.

According to the present embodiment, when the controller 114 of the node 100a shares the application key with the node 100b, the controller 114 does not actually generate the cryptographic key (application key) from a random number to transfer the cryptographic key. The controller 114 performs control to use the link key that is already shared as the cryptographic key (application key), and to provide each application 200 with this application key.

Moreover, the controller 114 of the node 100a may determine again whether to actually use the link key as the cryptographic key (application key) based on an amount of the cryptographic key shared with the applicable node (node 100b), or to operate to generate the cryptographic key (application key) from a random number to transfer the cryptographic key.

Moreover, the controller 114 of the node 100a may be currently transferring the application key by using the applicable link key. In this case, however, determination may be made to give priority to a transfer operation of the application key that uses the link key, and not to use the link key as the application key.

Description of the sequence of the present embodiment will be continued. The node 100a transmits application key sharing control data to the node 100b (step S405). The control data includes at least data that shows "the link key is used as the application key". The control data may further include identification information about the link key to be used as the application key (such as a key ID and a sequence number), and information that specifies some conversion process to be performed when the applicable link key is used as the application key. Examples of the conversion process include processing for combining a plurality of link keys into one application key, and processing for dividing and converting a link key into a plurality of application keys. The control data may also include information that indicates what value to be set for the key ID and sequence number required for the node 100 to manage the cryptographic key as the application key, identification information for identifying a pair of applications 200 that allows the use of the applicable cryptographic key, and information for identifying session information.

Subsequently, the node 100b may notify the node 100a of response information. The response information may be simple information on whether the node 100b agrees to handle the link key instructed from the node 100a as the application key, or whether it is possible to handle the link key instructed from the node 100a as the application key.

The response information may also include other information. For example, assume that the node 100a transmits the application key sharing control data including the key ID of the link key to be used as the application key, and that the node 100b receives the control data. There is a possibility that, at this time, the node 100b has already used part of the link key specified by the node 100a, and that the link key cannot be used as the application key. In this case, the node 100b may simply notify that the node 100b cannot respond to the application key sharing control data (that is, negative acknowledgement). Alternatively, the node 100b may present again the node 100a a range of the link key that can be used as the application key.

In accordance with the above procedure, the node 100a and the node 100b convert the link key of an identical range to store as the application key (step S406, step S407). When the link key is converted into the application key, a data conversion process or a copy of data do not necessarily occur. For example, there is a possibility that the link key and the application key are managed in an identical database system. In this case, the link key may be converted into the application key only by changing management of entry in the database.

When the link key is converted into the application key, the node 100b may notify a conversion result to the node 100a (step S408). Similarly, the node 100a may notify a conversion result to the node 100b.

In accordance with the above procedure, the node 100a and the node 100b can share the application key by using the already shared link key while avoiding a processing procedure and processing load such as generation of a random number (application key), encryption of the random number (application key) by using the link key, transfer processing of the encrypted application key, and decryption processing in the node 100b. To be brief, it becomes possible not to perform a procedure of FIG. 4, but to perform a procedure of FIG. 6 with lower processing load and a simpler procedure steps.

Subsequently, the shared application key is provided from the node 100a to the application 200a (step S409). In addition, in response to a request from the application 200b, the application key is provided from the node 100b to the application 200b (step S410, step S411).

Figure 7:
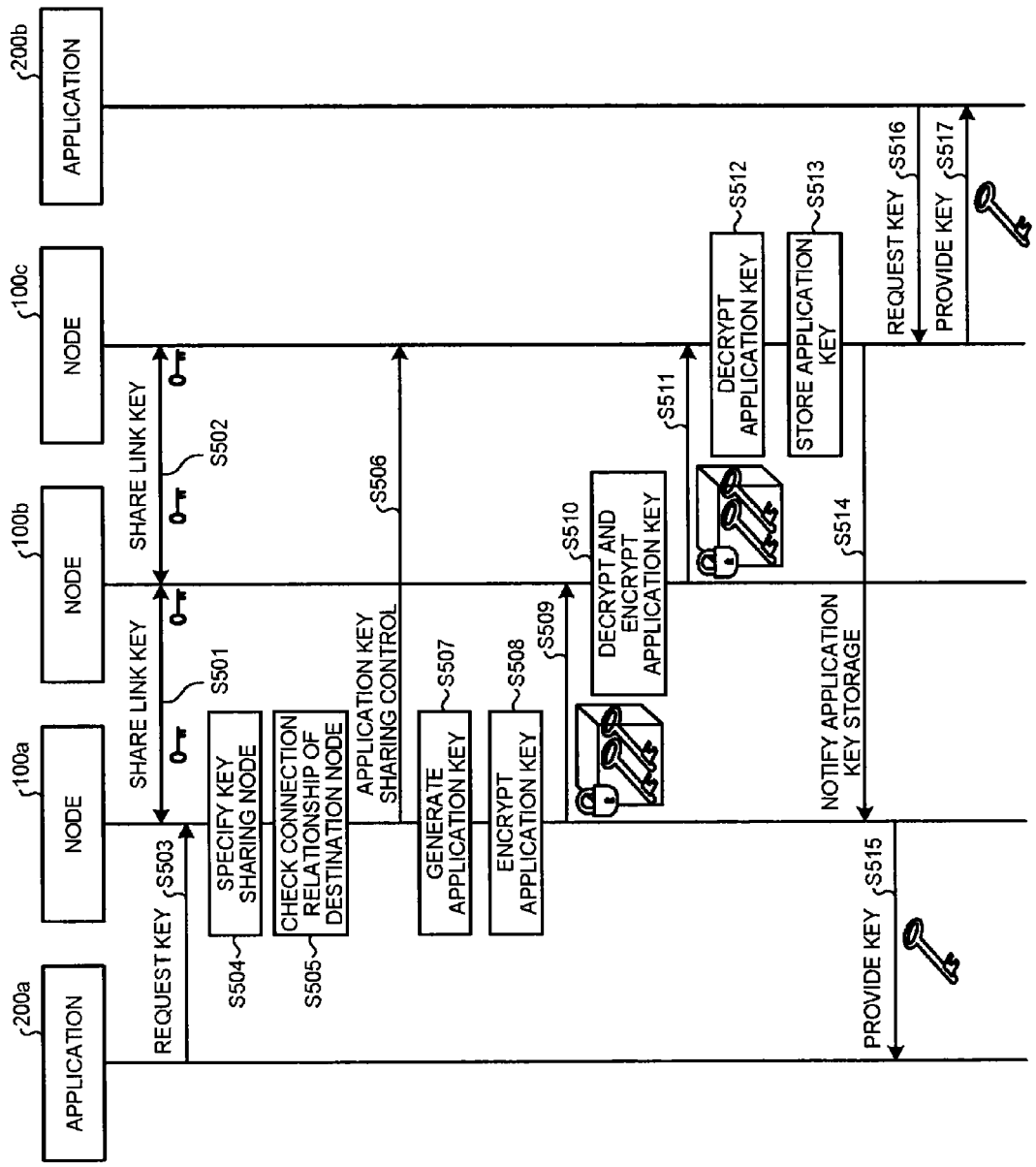
FIG. 7 is a sequence diagram of cryptographic key sharing processing according to the present embodiment.

Next, another example of the cryptographic key sharing processing according to the present embodiment will be described with reference to FIG. 7. FIG. 7 is a sequence diagram illustrating another example of the cryptographic key sharing processing according to the present embodiment. In the example of FIG. 7, the application 200a is connected to the node 100a, whereas the application 200b is connected to the node 100c. The application 200a and the application 200b desire to perform cryptographic data communication. An operation to share the cryptographic key (link key) by QKD is repeated between the node 100a and the node 100b, and between the node 100b and the node 100c—(step S501, step S502).

The application 200a is connected to the node 100a, and notifies the node 100a that the application 200a desires to communicate with the application 200b (request for the cryptographic key) (step S503). The node 100a, to which the application 200a is connected, determines with which node 100 the cryptographic key (application key) is to be shared in order that the application 200a communicates with the application 200b (step S504). In this example, the node 100a specifies that the node 100 with which the cryptographic key (application key) is to be shared is the node 100c to which the application 200b is connected.

Next, the determination unit 115 of the node 100a checks a "connection relationship" with the node 100c with which the cryptographic key is to be shared (step S505). The method for specifying the connection relationship has already been described. It is determined here that the connection relationship between the node itself (node 100a) and the applicable node (node 100c) is the connection by a network via a plurality of links (B1), that is, not adjacent connected by a single link (B2).

The controller 114 of the node 100a determines that the above-described method (A2) for utilizing the link key cannot be applied to the node 100b when sharing the application key, and determines, for example, to employ the method (A1) for generating the cryptographic key (application key) from a random number generator or the like and transferring the cryptographic key. That is, the following procedures are executed.

The node 100a starts application key sharing control (step S506). The application key sharing unit 112 generates the cryptographic key (application key) from a random number (step S507). With reference to a routing table generated by a routing mechanism that is separately operating in the node 100, the application key sharing unit 112 specifies that the node 100 corresponding to a next hop at a time of transferring the application key to the node 100c that is the applicable node is the node 100b.

The application key sharing unit 112 encrypts the application key by using the link key that is shared with the node 100b (step S508), and transfers the encrypted application key over the link connected to the node 100b (step S509).

On receipt of the encrypted application key, the node 100b decrypts the received application key by using the link key that is shared with the node 100a that shares the received link (step S510). Moreover, in order to transfer the applicable application key to the node 100c, the node 100b specifies the link to which to transmit the decrypted application key, and specifies that the node 100 corresponding to the next hop is the node 100c itself.

The node 100b encrypts the decrypted application key by using the link key that is shared with the node 100c (step S510), and transfers the encrypted application key over the link connected to the node 100c (step S511).

On receipt of the encrypted application key, the node 100c decrypts the received application key by using the link key that is shared with the node 100b that shares the received link (step S512). The node 100c stores the decrypted cryptographic key as the application key to be shared with the node 100a (step S513).

While the above description shows the procedure for directly transferring the application key, in practice, at a timing of before transmission, after transmission, or both before and after transmission of the application key, the node 100a may transmit, to the node 100c, additional data, such as a size of the application key to transmit, a key ID to be assigned to the application key (or sequence number), and information regarding the application 200 to which the application key is provided, as application key sharing control data.

After receiving the application key sharing control data and before receiving the actual application key, the node 100c may notify that the node 100c cannot respond to the application key sharing control data (that is, negative acknowledgement), and refuse sharing of the application key. Alternatively, after receiving the application key sharing control data and before receiving the actual application key, the node 100c may transmit, to the node 100a, a response message including a desire to modify at least part of information included in the application key sharing control data for the application key sharing control data.

After receiving and storing the application key from the node 100a, the node 100c may notify response information to the node 100a (step S514). The response information may be simply only information that shows that the application key transmitted from the node 100a is received.

In accordance with the above procedure, the node 100a and the node 100c each store an identical application key. Subsequently, the shared application key is provided from the node 100a to the application 200a (step S515). In addition, in response to a request from the application 200b, the application key is provided from the node 100c to the application 200b (step S516, step S517).

In this way, the communication device according to the present embodiment can suppress the processing delay required for cryptographic key sharing.

Figure 8:
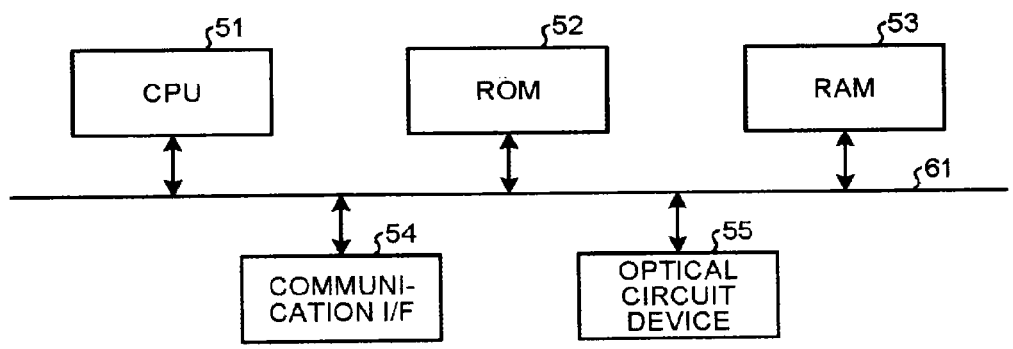
FIG. 8 is a hardware configuration diagram of a communication device according to the present embodiment.

Next, a hardware configuration of the communication device according to the present embodiment will be described with reference to FIG. 8. FIG. 8 is an illustrative diagram illustrating a hardware configuration of the communication device according to the present embodiment.

The communication device according to the present embodiment includes a control device, such as a central processing unit (CPU) 51, a storage device, such as a read only memory (ROM) 52 and a random access memory (RAM) 53, a communication I/F 54 to be connected to a network for making communication, and a bus 61 for connecting each unit. Furthermore, an optical circuit device 55 for implementing quantum key distribution may be connected to the bus 61.

A program to be executed by the communication device according to the present embodiment is incorporated and provided in the ROM 52 or the like.

The program to be executed in the communication device according to the present embodiment is an installable file or an executable file. The program may be configured to be stored in a computer-readable storage medium such as a compact disk read only memory (CD-ROM), a flexible disk (FD), a compact disk recordable (CD-R), and a digital versatile disk (DVD), and to be provided as a computer program product.

The program to be executed in the communication device according to the present embodiment may also be configured to be stored in a computer that is connected to a network, such as the Internet, and to be provided by allowing download via the network. The program to be executed in the communication device according to the present embodiment may also be configured to be provided or distributed via the network, such as the Internet.

The program to be executed in the communication device according to the present embodiment can cause a computer to function as each of the above-described units of the communication device. In this computer, the CPU 51 can read the program from the computer-readable storage medium into the main storage device and execute the program.

While a certain embodiment has been described, the embodiment has been presented by way of example only, and is not intended to limit the scope of the inventions. Indeed, the novel embodiment described herein may be embodied in a variety of other forms; furthermore, various omissions, substitutions and changes in the form of the embodiment described herein may be made without departing from the spirit of the inventions. The accompanying claims and their equivalents are intended to cover such forms or modifications as would fall within the scope and spirit of the inventions.

What is claimed is:

1. A communication device comprising:
   a first manager to share a first cryptographic key with a first external device that is connected via a link;
   a second manager to share a second cryptographic key that is provided to an application, with the first external device and with a second external device that is connected via a plurality of links;
   a first communication unit to transmit to the first external device, the second cryptographic key being encrypted using the first cryptographic key;
   a determination unit to determine whether a device with which the second cryptographic key is to be shared is the first external device;
   a controller to control the second manager to share, as the second cryptographic key, a cryptographic key that is obtained by converting the first cryptographic key, when the device with which the second cryptographic key is to be shared is the first external device; and
   a second communication unit to provide the application with the second cryptographic key, wherein
   the controller further controls the second manager to convert the first cryptographic key when at least one of
      a residual quantity of the first cryptographic key is equal to or greater than a first threshold, and
      frequency of use of the first cryptographic key in encryption of the second cryptographic key is equal to or less than a second threshold.

2. The device according to claim 1, wherein the first communication unit further transmits specific information that specifies the converted first cryptographic key to the first external device.

3. The device according to claim 1, wherein the determination unit determines whether a device with which the application performs cryptographic communication is the first external device with reference to setup information on processing in which the first manager shares the first cryptographic key.

4. The device according to claim 1, wherein the determination unit determines whether a device with which the application performs cryptographic communication is the first external device with reference to network information.

5. The device according to claim 1, wherein the first manager shares the first cryptographic key based on quantum key distribution.

6. A communication method comprising:
sharing a first cryptographic key with a first external device that is connected via a link;
sharing a second cryptographic key that is provided to an application, with the first external device and with a second external device that is connected via a plurality of links;
transmitting the second cryptographic key to the first external device, the second cryptographic key being encrypted using the first cryptographic key;
determining whether a device with which the second cryptographic key is to be shared is the first external device, the second cryptographic key being provided to the application;
controlling the sharing of the second cryptographic key to share, as the second cryptographic key, a cryptographic key that is obtained by converting the first cryptographic key, when the device with which the second cryptographic key is to be shared is the first external device; and
transmitting the second cryptographic key to the application, wherein
the controlling includes controlling converting the first cryptographic key when at least one of
a residual quantity of the first cryptographic key is equal to or greater than a first threshold, and
frequency of use of the first cryptographic key in encryption of the second cryptographic key is equal to or less than a second threshold.

7. A non-transitory computer-readable medium including programmed instructions stored therein, wherein the instructions cause a computer to function as:
a first manager to share a first cryptographic key with a first external device that is connected via a link;
a second manager to share a second cryptographic key that is provided to an application, with the first external device and with a second external device that is connected via a plurality of links;
a first communication unit to transmit the second cryptographic key to the first external device, the second cryptographic key being encrypted using the first cryptographic key;
a determination unit to determine whether a device with which the second cryptographic key is to be shared is the first external device, the second cryptographic key being provided to the application;
a controller to control the second manager to share, as the second cryptographic key, a cryptographic key that is obtained by converting the first cryptographic key, when the device with which the second cryptographic key is to be shared is the first external device; and
a second communication unit to provide the application with the second cryptographic key, wherein
the controller further controls the second manager to convert the first cryptographic key when at least one of
a residual quantity of the first cryptographic key is equal to or greater than a first threshold, and
frequency of use of the first cryptographic key in encryption of the second cryptographic key is equal to or less than a second threshold.

* * * * *